United States Patent
Sokolowski

(10) Patent No.: US 6,702,976 B2
(45) Date of Patent: Mar. 9, 2004

(54) COLD HIBERNATED ELASTIC MEMORY SELF-DEPLOYABLE AND RIGIDIZABLE STRUCTURE AND METHOD THEREFOR

(76) Inventor: Witold Sokolowski, 432 E. Sandra Ave., Arcadia, CA (US) 91006

( * ) Notice: Subject to any disclaimer, the term of this patent is extended or adjusted under 35 U.S.C. 154(b) by 51 days.

(21) Appl. No.: 09/771,455

(22) Filed: Jan. 29, 2001

(65) Prior Publication Data

US 2002/0101008 A1 Aug. 1, 2002

(51) Int. Cl.$^7$ .............................................. B29C 67/20
(52) U.S. Cl. ....................................................... 264/321
(58) Field of Search ......................................... 264/321

(56) References Cited

U.S. PATENT DOCUMENTS

| | | | | |
|---|---|---|---|---|
| 4,525,316 A | * | 6/1985 | Galla et al. ................. 264/321 |
| 5,032,622 A | * | 7/1991 | Herrington et al. ............ 521/99 |
| 5,049,591 A | * | 9/1991 | Hayashi et al. .............. 521/159 |
| 5,188,792 A | * | 2/1993 | Drye et al. .................. 264/321 |
| 5,242,634 A | * | 9/1993 | Matsumoto et al. ......... 264/321 |
| 5,418,261 A | * | 5/1995 | Helsemans et al. ......... 521/174 |
| 5,626,814 A | * | 5/1997 | Vicino ........................ 264/321 |
| 6,156,842 A | * | 12/2000 | Hoenig et al. .............. 525/171 |

FOREIGN PATENT DOCUMENTS

EP            0 361 418     *   4/1990

* cited by examiner

*Primary Examiner*—Allan R. Kuhns

(57) ABSTRACT

An object constructed of a thermoplastic polymer foam is heated above the polymer softening temperature, compacted to a desired reduced volume and reduced to a temperature below the critical softening temperature for storage. On the object being subjected again to a temperature above the polymer softening temperature, it assumes its original shape and volume. The object can additionally include flexible polymer sheets, fabrics or liners.

3 Claims, 1 Drawing Sheet

Fig. 1
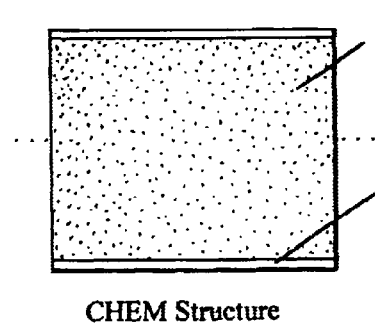
CHEM Structure
Fig. 2
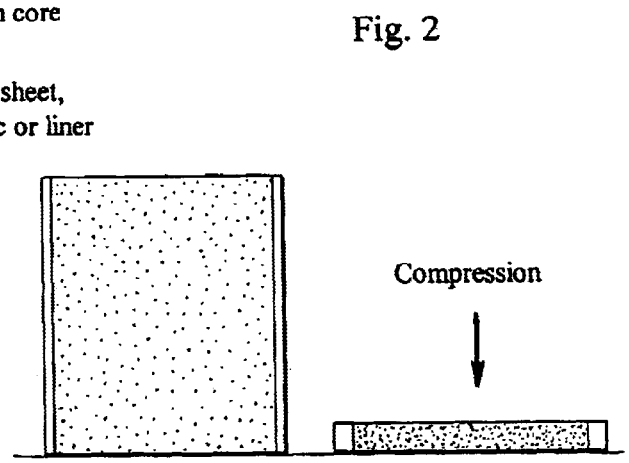
Fig. 3
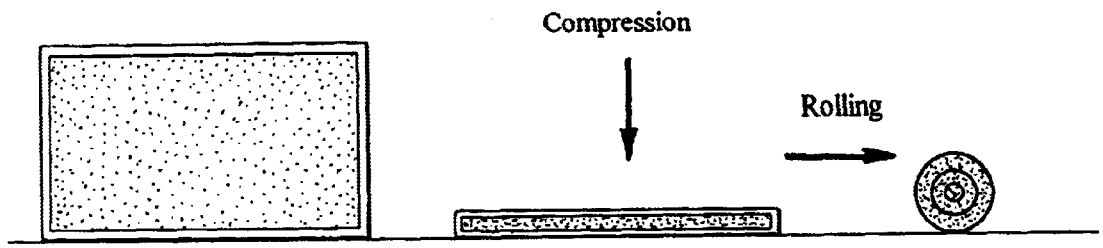
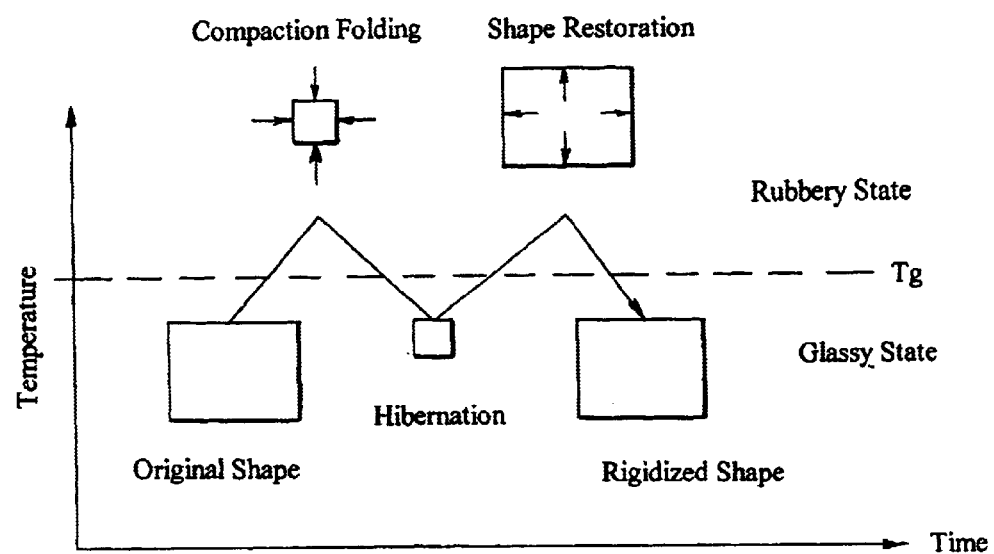
Fig. 4

COLD HIBERNATED ELASTIC MEMORY SELF-DEPLOYABLE AND RIGIDIZABLE STRUCTURE AND METHOD THEREFOR

BACKGROUND

SUMMARY OF THE INVENTION

The cold hibernated elastic memory self-deployable and rigidizable structure described here utilizes open cellular polymer foam structures or sandwich structures made of open cellular polymer foam structures and flexible polymer or polymeric composite skin sheets, fabrics or liners.

BRIEF DESCRIPTION OF THE DRAWINGS

FIG. 1 is a sectional view of an object constructed in accordance with this invention;

FIGS. 2 and 3 show different object compaction schemes; and

FIG. 4 shows in schematic form the method of the invention.

DESCRIPTION OF A PREFERRED EMBODIMENT

By this invention, structures or objects of any shape such as rods, tubes, wheels, boards, chassis, packages, tanks, shields, etc. are compacted to very small volumes in a flexible state above the glass (softening) transition temperature of the polymer foam (Tg) and later cooled below Tg to a glassy state. The high ratios >100 of modulus of elasticity E below Tg to E above Tg of polymer foam core allow the external compacting forces to be removed and the part can be stowed in a cold hibernated state below Tg.

A compacted part can be heated above Tg to a flexible state and the original shape will be restored by the foam's elastic recovery memory effect. When fully deployed, the structure can be rigidized by cooling below Tg to a glassy state. Once deployed and rigidized, a part can be heated and recompacted again.

The foams shall be made of the thermoplastic polymers which can be processed upon heating. To assure high flexibility in a soft state and high rigidity in a glassy state, the foams shall be heated or cooled 20 degrees C. above or below Tg, as the case may be. The glass transition temperature of polymer foam Tg should be just above the maximum ambient temperature to keep the part compacted or deployed in the glassy state most of the time. For example, for commercial applications it should be 50 degrees C. and higher. For any space application, the Tg of foam core should be above maximum temperature of the mission. Foams are machined to required shape in the glassy state because of their high machinability in this state.

Different thermoplastic polymer systems can be used for foam cores. However, a polyurethane based shape memory polymer SMP foams (U.S. Pat. No. 5,049,591) made by Mitsubishi Heavy Industry are recommended to be used in this invention. During testing and evaluation, they restored their original shapes after many thermo-mechanical processing compaction-deployment-rigidization cycles. In addition, SMP foams offer a wide range of Tg that can be selected from −70 degrees C. to +70 degrees C. and higher, resulting in a variety of potential space and commercial applications.

Depending upon the application, the described structures can use a flexible polymer or polymeric composite (fiber/polymeric matrix) skin in a form of sheets, fabrics or liners. Fibers provide the reinforcement for composite skins. In order to keep skins flexible, the Tg of skins should be below ambient use temperature. Skins shall be bonded to rigidized foam cores by adhesives or other appropriate joining methods.

The described structures can be compacted and packaged in different ways as shown in FIG. 3. They can be compacted by compression, rolling, or a combination of these two or other methods. Packaging can also be in forms such as accordion folding, roll-up, combination of these two or other appropriate packaging.

The described structures can be deployed by heating using different heat sources such as heating in an oven, by a hair dryer, or by solar heating. In some applications, electrically conductive fibers such as graphite fibers can provide reinforcement as well as heating for the deployment. Electrochromic coating or thermal blankets with high solar absorptivity/emissivity ratios can be used for solar heating.

A large number of uses are anticipated for space robotics and other support structures for telecommunications, space observatories, power, sensing, thermal control, impact and radiation protection systems as well as space habitats.

Many commercial uses suggest themselves, namely, self-deployable shelters, hangars, camping equipment, boats or life jackets, rafts, floating wheels, tanks, coolers, thermos containers, or outdoor furniture, among others. Parts can be transported and stored in small packages then expanded by heating at the outdoor site. After expansion, the structure will be allowed to cool to ambient temperature so as to become rigid for use. It is also contemplated that structures of this invention can be used in different biomedical applications such as vascular grafts, catheters, orthopedic braces and splints.

Although the present invention has been described in connection with a preferred embodiment, it is contemplated that one skilled in the appertaining arts will suggest modifications that come within the spirit of the invention as described in the specification and within the ambit of the appended claims.

What is claimed is:

1. A method of selective compaction, storage, deployment and rigidization of a sandwich construction object having a thermoplastic polymer foam core and skins, comprising the steps of:

heating the object to at least 20 degrees C. above the softening transition temperature Tg of the foam core;

compacting the object to reduced volume while maintaining the temperature in excess of the softening transition temperature Tg of the foam core;

lowering the temperature of the compacted object to at least 20 degrees C. below the softening transition temperature Tg of the thermoplastic polymer foam core and maintaining this lowered temperature throughout storage;

heating the stored compacted object to at least 20 degrees C. above the softening transition temperature Tg of the foam core for deployment; and lowering the deployed object temperature to at least 20 degrees C. below the softening transition temperature Tg of the foam core for object rigidization.

2. A method as in claim 1, in which the object foam core has a softening transition temperature Tg minimum of 50 degrees C.

3. A method as in claim 1, in which the object foam core has a softening transition temperature Tg below about human body temperature of 37 degrees C.

* * * * *